United States Patent
Skaarup Jensen et al.

(10) Patent No.: US 6,733,283 B2
(45) Date of Patent: May 11, 2004

(54) METHOD AND PLANT FOR MANUFACTURING CEMENT CLINKER

(75) Inventors: Lars Skaarup Jensen, Vallensbaek (DK); Kent Thomsen, Roskilde (DK)

(73) Assignee: F. L. Smidth A/S, Valby (DK)

( * ) Notice: Subject to any disclaimer, the term of this patent is extended or adjusted under 35 U.S.C. 154(b) by 0 days.

(21) Appl. No.: 10/344,512

(22) PCT Filed: Jul. 19, 2001

(86) PCT No.: PCT/IB01/01296

§ 371 (c)(1),
(2), (4) Date: Feb. 12, 2003

(87) PCT Pub. No.: WO02/16849

PCT Pub. Date: Feb. 28, 2002

(65) Prior Publication Data

US 2004/0029064 A1 Feb. 12, 2004

(30) Foreign Application Priority Data

Aug. 24, 2000 (DK) .................................... 2000 01253

(51) Int. Cl.⁷ ............................................... F27B 15/00
(52) U.S. Cl. ............................................ 432/14; 432/58
(58) Field of Search ............................. 432/58, 13, 14, 432/106; 106/100, 103, 713, 756, 758, 761; 110/245, 345, 347

(56) References Cited

U.S. PATENT DOCUMENTS

| | | | |
|---|---|---|---|
| 3,891,383 A | * | 6/1975 | Kobayashi ................... 432/80 |
| 4,014,641 A | | 3/1977 | Shigeyoshi |
| 4,759,711 A | | 7/1988 | Ichiyanagi et al. |
| 5,292,247 A | | 3/1994 | Bauer |
| 5,713,734 A | | 2/1998 | Makris |
| 5,919,301 A | | 7/1999 | Rother |
| 5,954,499 A | * | 9/1999 | Jessen ........................ 432/106 |
| 6,447,598 B2 | * | 9/2002 | Kuhnke et al. ............. 106/743 |
| 6,544,032 B1 | * | 4/2003 | Brentrup ...................... 432/14 |

* cited by examiner

*Primary Examiner*—Gregory Wilson
(74) *Attorney, Agent, or Firm*—Jeffrey S. Melcher; Manelli Denison & Selter, PLLC

(57) ABSTRACT

A description is given of a method as well as a plant for manufacturing cement clinker by which method cement raw meal is preheated in a preheater (1), calcined in a calciner (3) comprising an upper end (3a) and a lower end (3b), burned into clinker in a kiln (5) and cooled in a subsequent clinker cooler (7). The invention is peculiar in that exhaust gases from the kiln (5) are introduced into the upper end (3a) of the calciner, in that fuel is likewise introduced into the upper end (3a) of the calciner, in that the exhaust gas/fuel suspension is directed down through the calciner (3), in that preheated air from the clinker cooler (7) and preheated raw meal from the preheater (1) in combination or separately are fed into the calciner (3) at a location under the zone where exhaust gases from the kiln and fuel are introduced, in that the preheated air is directed down through the calciner (3), being gradually mixed with the exhaust gas/fuel suspension, in that the raw meal under the action of gravity is directed down through the calciner (3) along its wall, being suspended in the exhaust gases at the lower end (3b) of the calciner, and in that the exhaust gas/raw meal suspension is extracted from the lower end (3b) of the calciner and conveyed to a separating means (4) for separating the raw meal which is subsequently directed to the kiln (5). Hereby is obtained a significant reduction of the NOx which is led to the calciner together with the kiln exhaust gases, a high degree of fuel burn out even when using fuels with a low content of volatile constituents, and a low degree of conversion into NOx of the nitrogen which is led to the calciner together with the fuel.

13 Claims, 1 Drawing Sheet

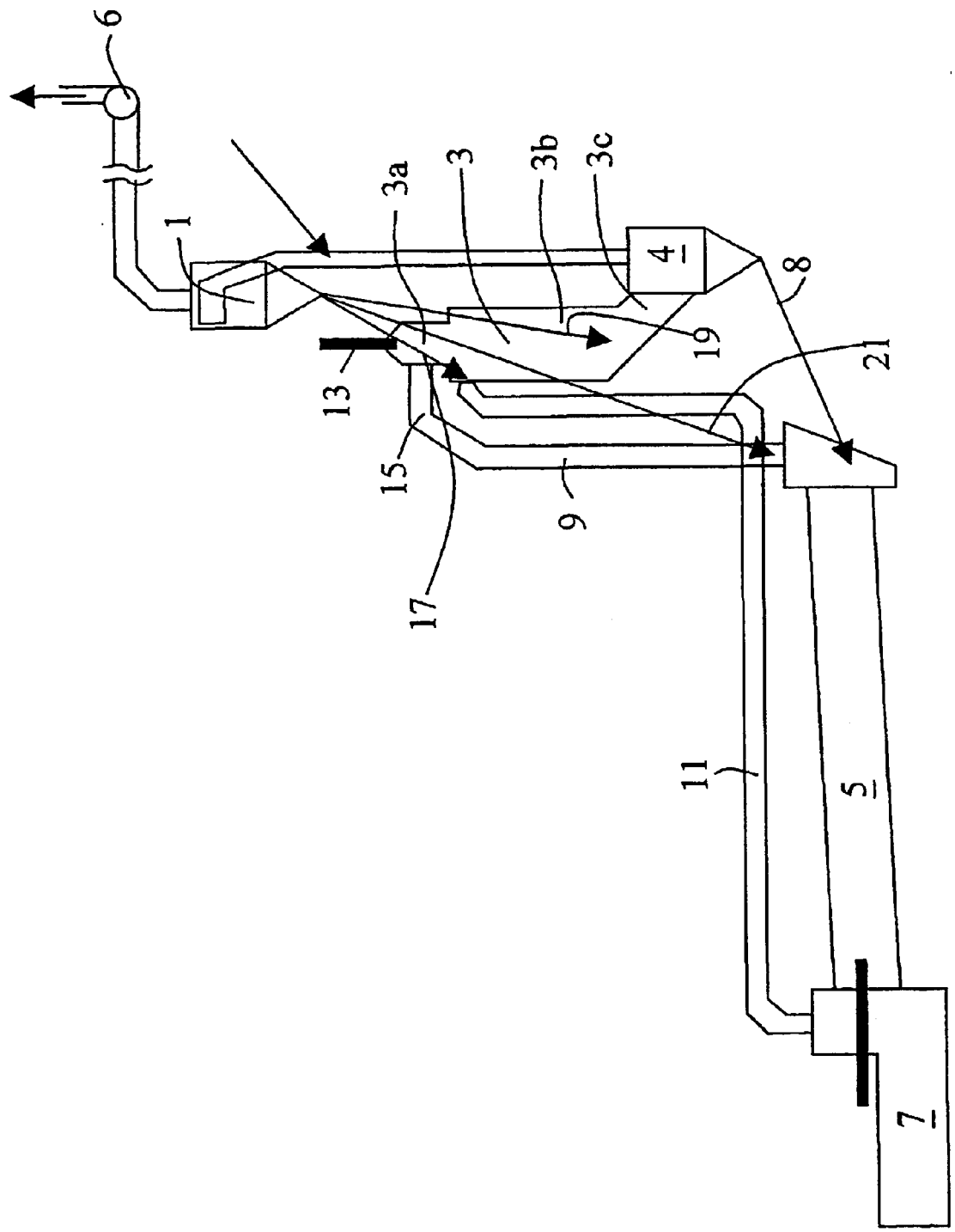

METHOD AND PLANT FOR MANUFACTURING CEMENT CLINKER

The present invention relates to a method for manufacturing cement clinker by which method cement raw meal is preheated in a preheater, calcined in a calciner comprising an upper end and a lower end, burned into clinker in a kiln and cooled in a subsequent clinker cooler. The invention also relates to a plant for carrying out the method.

A plant of the above-mentioned kind for manufacturing cement is well known from the literature. In some plants the calciner is specificially designed for using fuels having a low content of volatile constituents, such as petrocoke, whereas in other plants the calciner is specifically designed for attaining a low $NO_x$ emission level. There is strong evidence that henceforth more stringent requirements will be imposed in terms of acceptable $NO_x$ emission levels and that the utilization of fuels with a low content of volatile constituents will continue to be advantageous. Accordingly, there is a need for a method as well as a plant for manufacturing cement which will embody both of these beneficial effects at one and the same time.

A range of technologies are available for limiting $NO_x$ emission levels and for burning fuels with a low content of volatile constituents in plants of the aforementioned kind. It will be possible to limit $NO_x$ emission levels by primary methods, such as the appropriate design of burner equipment, appropriate design of calciner and preheater, or by secondary methods involving injection of extraneous substances such as ammonia and urea at designated locations in the preheater.

For example, a kiln plant of the type ILC low-$NO_x$ is known from Japanese patent application No. 155433-1978. This plant comprises a combustion chamber which is located between the kiln and the calciner and which in practice constitutes the lower part of the calciner. Limitation of $NO_x$ emission is achieved by injecting fuel into the combustion chamber which constitutes a so-called reducing zone, involving a combustion of fuel by reacting with $NO_x$ contained in the exhaust gases from the kiln, thereby reducing the $NO_x$ content. According to more recently known methods a small amount of preheated raw meal from the preheater may be introduced into this zone in order to limit the temperature. Preheated air from the clinker cooler as well as preheated raw meal from the preheater are subsequently fed to the calciner. In this known kiln plant, exhaust gases from the kiln are introduced at the bottom of the combustion chamber, thereby causing the gases to flow upwards through the combustion chamber and the subsequent calciner. In this type of calciner the raw meal must thus be directed up through the main part of the calciner suspended in the gas stream which flows upwards through the calciner. As for this type of calciner, it is a distinct disadvantage that a low $NO_x$ emission cannot be attained when burning fuels with a low content of volatile constituents in the calciner because of the excessive cooling of the gas/fuel suspension.

For example, kiln plants of the type SLC-D is known from U.S. Pat. No. 4,014,641 and PCT/DK97/00029. This type of plant incorporates a calciner which comprises a chamber configured as a downward-directed gas duct which at its lower end is connected to an upward-directed gas duct which is further connected to the exhaust gas discharge end of the kiln. Calcination essentially takes place in the downward-directed gas duct. The majority of the fuel used in the calciner is introduced axially at the top of the calciner. Preheated air from the clinker cooler and preheated raw meal are directed tangentially into the top of the calciner. Complete combustion of a substantial amount of the calciner fuel is thus attained in the calciner while the raw meal is simultaneously calcined during its passage down through the chamber. The suspension of exhaust gases, unburned fuel and at least partially calcined raw meal from the calciner are joined together in the upward-directed gas duct with an upward flow of kiln exhaust gases, to which should possibly be added a small amount of the calciner fuel and a small amount of preheated raw meal. The combined or intermingled exhaust gas/material suspension subsequently flows up through the upward-directed gas dust where any residual amount of raw meal and preheated air which have not yet been supplied from the clinker cooler can be added. The advantage of this known type of plant is that fuels with a low content of volatile constituents can be used due to the special embodiment of the calciner which will make it possible to attain a high degree of combustion efficiency even when using such fuels. Further, the production of $NO_x$ in the calciner is quite low. However, the disadvantage of this type of kiln plant is that it may become necessary to add a proportion of uncalcined raw meal directly into the exhaust gases from the kiln in order to fight coatings in the kiln smoke chamber and/or in the kiln riser duct. As a result the exhaust gas/fuel suspension is cooled excessively which entails limited possibilities of reducing the $NO_x$ which is produced in the kiln, when using fuel with a low content of volatile constituents.

It is the objective of the present invention to provide a method as well as a plant for manufacturing cement by means of which it will be possible to attain a high degree of combustion efficiency even when using fuel with a low content of volatile constituents and to attain a low level of $NO_x$ emission.

This is obtained by a method of the kind mentioned in the introduction and being characterized in that exhaust gases from the kiln are introduced into the upper end of the calciner, in that fuel is likewise introduced into the upper end of the calciner, in that the exhaust gas/fuel suspension is directed down through the calciner, in that preheated air from the clinker cooler and preheated raw meal from the preheater in combination or separately are fed into the calciner at a location under the zone where exhaust gases from the kiln and fuel are introduced, in that the preheated air is directed down through the calciner, being gradually mixed with the exhaust gas/fuel suspension, in that the raw meal under the action of gravity is directed down through the calciner along its wall, being suspended in the exhaust gases at the lower end of the calciner, and in that the exhaust gas/raw meal suspension is extracted from the lower end of the calciner and conveyed to a separating means for separating the raw meal which is subsequently directed to the kiln.

Hereby is obtained a significant reduction of the $NO_x$ which is led to the calciner together with the kiln exhaust gases, a high degree of fuel burn out even when using fuels with a low content of volatile constituents, and a low degree of conversion into $NO_x$ of the nitrogen which is led to the calciner together with the fuel. It will thus be possible to generate a $NO_x$-reducing zone by introducing calciner fuel into the $NO_x$-laden kiln exhaust gases while simultaneously ensuring a high combustion temperature within the range 900 and 1500° C. even when the combustion process is based on fuels with a low content of volatile constituents. As a result, the resultant $NO_x$-formation will be at a much lower level than is attainable for prior art. The high combustion temperature is attained due to the fact that the raw meal, because of the downward-directed passage through the calciner, is routed down along the wall of the calciner, substantially under the action of gravity. This will reduce the cooling effect of the raw meal on the exhaust gas/fuel suspension during the combustion of the fuel. The high combustion temperature will also ensure, in addition to a low net formation of $NO_x$, a rapid combustion of the fuel which is necessary for stable plant operation. The raw meal which is directed down along the wall of the calciner will also protect the latter against the high temperatures which may occur, thus reducing, as a spin-off effect, the level of coatings on the wall.

The kiln exhaust gases may be introduced into the upper end of the calciner according to various suitable methods, such as radially, tangentially or axially.

The fuel may be introduced into the upper end of the calciner, either separately or together with the kiln exhaust gases. If the fuel is introduced separately this will preferably be done by injecting the fuel axially from the top of the calciner. Such axial injection may occur along the centreline of the calciner, but may also be radially displaced relative to the centreline. However, the fuel may also be injected radially, tangentially or in some other way from the side of the calciner. If the fuel is introduced together with the kiln exhaust gases it is preferred that the fuel is introduced into the kiln exhaust gases at such a location where effective contact can be ensured between the fuel and the $NO_x$ in the exhaust gases, thereby optimizing the $NO_x$ reduction process. Preferably, this can be done at an appropriate location before the kiln exhaust gases are introduced into the calciner.

The mixed suspension of kiln exhaust gases and fuel is preferably led down through the calciner, generating a flame in its central zone.

The preheated air from the clinker cooler and preheated raw meal from the preheater are preferably introduced into the calciner as a combined air/raw meal suspension. It is further preferred that this air/raw meal suspension is introduced tangentially so that the raw meal is slung out towards the calciner wall causing it to slide down along the wall, under the action of gravity, while the air forms an enveloping air cushion around the flame so that the air is gradually mixed with the exhaust gases/fuel suspension.

Alternatively, the preheated air from the clinker cooler and preheated raw meal from the preheater may be separately introduced into the calciner. In cases where this procedure is applied, the air may also be introduced axially, radially or in any other appropriate manner, while the raw meal may advantageously be introduced via one inlet opening or several inlet openings, arranged in a substantially uniform pattern around the circumference of the calciner.

For controlling the combustion temperature in the calciner, and thus to ensure a satisfactory degree of burn out of fuels which require a relatively long period of time at high temperatures, such as fuels having a low content of volatile constituents, it would be advantageous if the preheated raw meal is introduced into the calciner at several locations downstream along the unit. Thus, it is preferred that preheated raw meal may be introduced into the lower end of the calciner. Raw meal introduced into the lower end of the calciner will promptly undergo calcination, thus reducing the temperature to the level which applies to the calcination process.

Preheated raw meal from the preheater may further be introduced into the calciner together with the kiln exhaust gases in order to bring about, due to its catalytic effect, a further reduction of the $NO_x$ level i.a. by promoting the reaction $NO+CO$ to $N_2+CO_2$. Preheated raw meal which is introduced in this manner may advantageously be introduced into the kiln exhaust gas stream immediately after the discharge of these gases from the kiln. As a consequence hereof, the raw meal will lower the temperature of the kiln exhaust gases, thereby reducing any caking problems in the duct which carry the kiln exhaust gases from the kiln to the calciner. In this scenario, the exhaust gas/raw meal suspension may advantageously be introduced tangentially into the upper end of the calciner so as to ensure that the raw meal is kept close to the wall of the calciner. As a result, the amount of raw meal in the central part of the reducing zone of the calciner will be quite small, and this means that a high temperature, and thus advantageous conditions for ignition and $NO_x$-reduction, can be attained even when using fuels having a low content of volatile constituents.

The plant for carrying out the method according to the invention is of the kind which comprises a preheater, a calciner comprising an upper end and a lower end, a kiln and a subsequent clinker cooler, and being characterized in that it comprises means for introducing kiln exhaust gases into the upper end of the calciner, means for introducing fuel into the upper end of the calciner, means for introducing preheated air from the clinker cooler into the calciner at a location under the zone for introducing kiln exhaust gases and fuel, means for introducing preheated raw meal into the calciner at a location under the zone for introducing kiln exhaust gases and fuel, means for extracting exhaust gas/raw meal suspension from the lower end of the calciner and to convey it to a separating means and means for conveying the separated raw meal to the kiln.

The invention will be explained in further details in the following with reference being made to the drawing, the only FIGURE of which shows a plant for carrying out the method according to the invention.

In the FIGURE is shown a kiln plant for manufacturing cement clinker. This plant comprises a cyclone preheater, of which only the last cyclone 1 is shown in the FIGURE, a calciner 3 with separating cyclone 4, a rotary kiln 5, as well as a clinker cooler 7. The plant also comprises a kiln riser duct 9 for conveying kiln exhaust gases to the calciner 3, and a duct 11 for conveying preheated air from the clinker cooler 7 to the calciner 3. Raw meal from a not shown raw mill installation is preheated in the preheater in counterflow with the exhaust gases whereafter it is separated from the preheater in the cyclone 1 and conveyed to the calciner 3 in which it undergoes calcination. From the bottom outlet of the separating cyclone 4, the calcined raw meal is directed via a duct 8 to the rotary kiln 5 in which it is burned into cement clinker which is subsequently cooled in the clinker cooler 7. The exhaust gases from the rotary kiln 5 and the calciner 3 are drawn from the calciner 3 through the cyclone 4 and up through the preheater by means of a schematically depicted fan 6.

According to the invention kiln exhaust gases are introduced into the upper end 3a of the calciner 3 either simultaneously with or immediately after at least the main part of the fuel is introduced into the calciner. In the embodiment shown, fuel is introduced into the calciner 3 via a burner 13 which is arranged so that it protrudes axially into the top of the calciner 3 while the kiln exhaust gases are introduced via an inlet duct 15 which discharges tangentially into the side of the upper end 3a of the calciner. Therefore, the combustion of the fuel which is introduced into the calciner 3 via the burner 13 is initiated in an atmosphere which consists of kiln exhaust gases with a low oxygen content. As a result, a reducing zone will be formed in which the $NO_x$ which is supplied together with the kiln exhaust gases reacts with the fuel, thereby reducing the $NO_x$ level.

Further downstream of the calciner, after a reducing zone of appropriate length, preheated air from the clinker cooler 7 is introduced via the duct 11 which discharges tangentially into the calciner 3. The main part of the preheated raw meal from the preheater is introduced into the calciner as shown at the arrow 17 together with the preheated air from the cooler. Because of the tangential method of introduction, the preheated air/raw meal suspension will flow downwards through the subsequent combustion zone following a spiral-shaped path, causing the raw meal to be slung out towards the wall of the calciner, whereafter it slides down along this wall under the action of gravity while the preheated air envelops the flame in the central part of the calciner so that it is gradually mixed with the exhaust gas/fuel suspension. As a result, the amount of raw meal in the central part of the combustion zone of the calciner will be quite small, and this means that a high temperature, and thus a high degree of fuel burn out, can be attained even when using fuels having a low content of volatile constituents. The raw meal which slides down along the wall of the calciner is calcined by accumulation of the heat from the central combustion zone of the calciner, and it thus serves as a heat shield which protects the calciner wall against the high temperatures which prevail in the combustion zone.

In the lower end 3b of the calciner, the raw meal is suspended in the downward-directed exhaust gas stream, causing the raw meal to undergo further calcination and lowering the temperature of the exhaust gases. The exhaust gas/raw meal suspension is subsequently conveyed via a transition section 3c to the separating cyclone 4 in which the raw meal is separated from the exhaust gases and conveyed to the rotary kiln 5 via the bottom outlet of the cyclone 4.

For controlling the temperature in the combustion zone and to ensure a simultaneous reduction in the discharge temperature of the exhaust gases from the calciner, a small amount of preheated raw meal may be introduced into the lower end 3b of the calciner, as shown at the arrow 19, or into the transition section 3c.

A small amount of preheated raw meal from the preheater may further be introduced into the kiln exhaust gas stream immediately after the latter has been discharged from the rotary kiln 5 as shown at the arrow 21. This raw meal will then lower the temperature of the kiln exhaust gases, thereby reducing any caking problems in the duct 9. Also, due to its catalytic effect, this raw meal will further reduce the $NO_x$ level in the calciner 3. In this case, the exhaust gas/raw meal suspension is introduced tangentially into the upper end of the calciner in order to keep the raw meal close to the wall of the calciner. As a result, the amount of raw meal in the central part of the reducing zone of the calciner will be quite small, which means that a high temperature, and thus advantageous conditions for ignition and $NO_x$-reduction, can be attained even when using fuels having a low content of volatile constituents.

What is claimed is:

1. A method for manufacturing cement clinker by which method cement raw meal is preheated in a preheater (1), calcined in a calciner (3) comprising an upper end (3a) and a lower end (3b), burned into clinker in a kiln (5) and cooled in a subsequent clinker cooler (7), characterized in that exhaust gases from the kiln (5) are introduced into the upper end (3a) of the calciner, in that fuel is likewise introduced into the upper end (3a) of the calciner, in that the exhaust gas/fuel suspension is directed down through the calciner (3), in that preheated air from the clinker cooler (7) and preheated raw meal from the preheater (1) in combination or separately are fed into the calciner (3) at a location under the zone where exhaust gases from the kiln and fuel are introduced, in that the preheated air is directed down through the calciner (3), being gradually mixed with the exhaust gas/fuel suspension, in that the raw meal under the action of gravity is directed down through the calciner (3) along its wall, being suspended in the exhaust gases at the lower end (3b) of the calciner, and in that the exhaust gas/raw meal suspension is extracted from the lower end (3b) of the calciner and conveyed to a separating means (4) for separating the raw meal which is subsequently directed to the kiln (5).

2. A method according to claim 1, characterized in that the kiln exhaust gases are introduced into the upper end of the calciner (3a) radially, tangentially or axially.

3. A method according to claim 2, characterized in that fuel is introduced into the upper end (3a) of the calciner together with the kiln exhaust gases.

4. A method according to claim 1, characterized in that fuel is introduced separately into the upper end (3a) of the calciner.

5. A method according to claim 4, characterized in that the fuel is injected axially from the top of the calciner (3).

6. A method according to claim 1, characterized in that the mixed suspension of kiln exhaust gases and fuel is led down through the calciner (3), generating a flame in its central zone.

7. A method according to claim 1, characterized in that preheated air from the clinker cooler (7) and preheated raw meal from the preheater (1) are introduced into the calciner as a combined air/raw meal suspension.

8. A method according to claim 7, characterized in that the air/raw meal suspension is introduced tangentially so that the raw meal is slung out towards the calciner wall causing it to slide down along the wall, under the action of gravity, while the air forms an enveloping air cushion around the flame so that the air is gradually mixed with the exhaust gases/fuel suspension.

9. A method according to claim 1, characterized in that preheated raw meal is introduced into the calciner (3) at several locations downstream along the unit.

10. A method according to claim 9, characterized in that preheated raw meal from the preheater (1) is introduced into the lower end (3b) of the calciner and/or into the transition section (3c).

11. A method according to claim 1, characterized in that preheated raw meal from the preheater (1) is introduced into the calciner together with the kiln exhaust gases.

12. A method according to claim 11, characterized in that the preheated raw meal which is introduced in this manner, is introduced into the kiln exhaust gas stream immediately after the discharge of these gases from the kiln (5).

13. A plant for carrying out the method according to the invention of the kind which comprises a preheater (1), a calciner (3) comprising an upper end (3a) and a lower end (3b), a kiln (5) and a subsequent clinker cooler (7), and being characterized in that it comprises means (15) for introducing kiln exhaust gases into the upper end (3a) of the calciner, means (13) for introducing fuel into the upper end (3a) of the calciner, means (11) for introducing preheated air from the clinker cooler (7) into the calciner (3) at a location under the zone for introducing kiln exhaust gases and fuel, means (17) for introducing preheated raw meal into the calciner (3) at a location under the zone for introducing kiln exhaust gases and fuel, means (6) for extracting exhaust gas/raw meal suspension from the lower end (3b) of the calciner and to convey it to a separating means (4) and means (8) for conveying the separated raw meal to the kiln (5).

* * * * *